United States Patent
Kasama

(10) Patent No.: US 8,150,949 B2
(45) Date of Patent: Apr. 3, 2012

(54) COMPUTING APPARATUS

(75) Inventor: Ichiro Kasama, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 423 days.

(21) Appl. No.: 12/552,651

(22) Filed: Sep. 2, 2009

(65) Prior Publication Data

US 2009/0327461 A1 Dec. 31, 2009

Related U.S. Application Data

(63) Continuation of application No. PCT/JP2007/054265, filed on Mar. 6, 2007.

(51) Int. Cl.
*G06F 15/177* (2006.01)
(52) U.S. Cl. .......... 709/221; 709/220; 709/246
(58) Field of Classification Search .......... 709/220, 709/221, 246
See application file for complete search history.

(56) References Cited

U.S. PATENT DOCUMENTS

| | | | | |
|---|---|---|---|---|
| 5,768,561 | A  * | 6/1998 | Wise | 709/221 |
| 7,570,663 | B2 * | 8/2009 | Jungck | 709/246 |
| 2005/0172103 | A1 | 8/2005 | Inuo et al. | |
| 2006/0245390 | A1* | 11/2006 | Omoto et al. | 370/328 |
| 2009/0262741 | A1* | 10/2009 | Jungck et al. | 370/392 |

FOREIGN PATENT DOCUMENTS

| | | |
|---|---|---|
| JP | 2004-221997 | 8/2004 |
| JP | 2005-157653 | 6/2005 |
| JP | 2005-222142 | 8/2005 |
| JP | 2006-203795 | 8/2006 |
| JP | 2006-303730 | 11/2006 |

OTHER PUBLICATIONS

Engiish Translation of the International Preliminary Report on Patentability issued Sep. 29, 2009 in corresponding International Patent Application PCT/JP2007/054265.
International Report on Patentability mailed Sep. 17, 2009 in corresponding International Patent Application PCT/JP2007/054265.
International Search Report for PCT/JP2007/054265, mailed May 15, 2007.

* cited by examiner

*Primary Examiner* — Phuoc Nguyen
(74) *Attorney, Agent, or Firm* — Staas & Halsey LLP

(57) ABSTRACT

A reconfigurable computing apparatus includes plural computing element networks respectively formed of computing elements of an identical bit width, the bit width of each of the computing element networks differing according to computing element network; a bit width converting element that converts bit widths between the computing element networks; a control signal-dedicated network that is formed of computing elements, is reconfigurable, and controls each of the computing element networks; and a sequencer that controls a timing at which circuit configurations are switched with respect to the computing element networks, the control signal-dedicated network, and the bit width converting element.

9 Claims, 4 Drawing Sheets

FIG.2

| BIT WIDTH | PE TYPE | ATTRIBUTE | SUMMARY |
|---|---|---|---|
| 4/8 | LOGIC PE | NO REGISTER | EXECUTES AND/OR/EOR/INV |
| 4/8 | COMPARE PE | NO REGISTER, HAS PREDICATE REGISTER, CONTROL FUNCTION | EXECUTES COMPARE/ADD-SUBTRACT COMMANDS, PREDICATE GENERATION FUNCTION |
| 4/8 | SHIFT PE | NO REGISTER | EXECUTES SHIFT/MASK COMMANDS, 8-BIT AND 16-BIT OUTPUT, CONNECTION TO UPPER BIT WIDTH |
| 4/8 | ADDITION-SUBTRACTION PE | NO REGISTER | EXECUTES ADD-SUBTRACT COMMANDS |
| 4/8 | PREDICATE PE | HAS REGISTER, CONTROL FUNCTION | GENERATES PREDICATE ACCORDING TO SPECIFIC CONDITION JUDGMENT |
| 4/8 | MULTIPLICATION PE | NO REGISTER | EXECUTES MULTIPLICATION, 8-BIT AND 16-BIT OUTPUT, CONNECTION TO UPPER BIT WIDTH |
| 4/8 | DELAY PE | HAS REGISTER, CONTROL FUNCTION | GENERATES DELAY OF 1 CLOCK CYCLE |
| 4/8 | COUNTER PE | HAS REGISTER, CONTROL FUNCTION | PERFORMS 4-BIT COUNTER OPERATION, GENERATES PREDICATE |
| 4/8 | RAM_PE | HAS REGISTER, CONTROL FUNCTION | 1RW OR 2RW TYPE DATA STORAGE |
| 4/8 | EXTENSION PE | HAS REGISTER, CONTROL FUNCTION | EXPANDS 4/8 BIT PRODUCT (ENCODE,0), CONNECTION TO UPPER BIT BY 4-BIT EXPANSION |
| 8 | ROUND PE | HAS REGISTER | PE FOR 4-BIT CONNECTION, USED WITH 4-BIT MULTIPLICATION PE TO ROUND |
| 32/16 | LOGIC PE | HAS REGISTER | EXECUTES AND/OR/EOR/INV |
| 32/16 | COMPARE PE | NO REGISTER, HAS PREDICATE REGISTER, CONTROL FUNCTION | EXECUTES COMPARE/ADD-SUBTRACT COMMANDS, PREDICATE GENERATION FUNCTION |
| 32/16 | SHIFT PE | NO REGISTER | EXECUTES SHIFT/MASK COMMANDS |
| 32/16 | ADDITION-SUBTRACTION PE | NO REGISTER | EXECUTES ADD-SUBTRACT COMMANDS |
| 32/16 | ABSOLUTE VALUE/ COMPLEMENT PE | NO REGISTER | EXECUTES ABSOLUTE VALUE/COMPLEMENT COMMANDS |
| 32/16 | ACCUMULATE PE | HAS REGISTER, CONTROL FUNCTION | ACCUMULATES INPUT DATA, ROUNDS AND OUTPUTS RESULT, PRECISION UNDETERMINED |
| 32/16 | PREDICATE PE | HAS REGISTER, CONTROL FUNCTION | GENERATES PREDICATE SPECIFIC ACCORDING TO CONDITION JUDGMENTS |
| 32/16 | DELAY PE | HAS REGISTER, CONTROL FUNCTION | GENERATES DELAY OF 1 CLOCK CYCLE |
| 16 | EXTENSION PE | HAS REGISTER, CONTROL FUNCTION | FOR 32-BIT CONNECTION |
| 32/16 | ROUND PE | HAS REGISTER, CONTROL FUNCTION | FOR 16-BIT, 8-BIT, 4-BIT CONNECTION, USED WITH 16-BIT MULTIPLICATION PE |
| 16/8 | ROUND PE | HAS REGISTER, CONTROL FUNCTION | FOR 8-BIT, 4-BIT CONNECTION, USED WITH 8-BIT MULTIPLICATION PE |
| 16 | MULTIPLICATION PE | HAS REGISTER | FOR 32-BIT CONNECTION |

US 8,150,949 B2

COMPUTING APPARATUS

CROSS REFERENCE TO RELATED APPLICATIONS

This is a continuing application, filed under 35 U.S.C. §111(a), of International Application PCT/JP2007/054265, filed Mar. 6, 2007, the contents of all of which are incorporated herein by reference.

FIELD

The embodiment discussed herein is related to a reconfigurable computing apparatus.

BACKGROUND

The following apparatuses are conventionally known reconfigurable computing apparatuses. For example, Japanese Laid-Open Patent Publication No. 2005-157653 discloses a data processing apparatus that has processing units and a connection network capable of configuring a first transmission path that serially connects at least a portion of the processing units, and includes a first communication unit that communicates data serially processed by the processing units connected to one another via the first transmission path and a second communication unit that communicates a message to a given processing unit by wormhole routing.

Japanese Laid-Open Patent Publication No. 2004-221997 discloses a reconfigurable circuit that includes a multilevel arrangement of logic circuits, each capable of selectively executing plural computational functions and a connecting unit capable of setting connection relationships between the output of an upstream logic circuit and the input of a downstream logic circuit and further includes an input-dedicated connection line capable of directly inputting data to an intermediate level logic circuit.

Computing elements constituting conventional reconfigurable computing apparatuses have the same bit width, e.g., 16 bits, except when the bit width is temporarily increased to perform rounding processing after multiplication. The same is true for the data processing apparatus disclosed in Japanese Laid-Open Patent Publication No. 2005-157653 and the reconfigurable circuit disclosed in Japanese Laid-Open Patent Publication No. 2004-221997. Thus, conventional configurations have a problem in that when computation is performed at bits less than the bit width of the computing element, the specifications of the mounted computing element are excessive and area efficiency is significantly reduced.

Further, Japanese Laid-Open Patent Publication No. 2005-157653 assumes a configuration of processing units that are computing elements each having the same bit width and thus, does not consider configurations in which one processing unit, i.e., computing element, has a bit width of 4, while another processing unit has a bit width of 8, and still another processing unit has a bit width of 16. Consequently, no technological consideration is given to performing bit compression (rounding), extension (expansion), etc. to convert bit width. In addition, there is no disclosure concerning simultaneous control of connections between processing units, bit width conversion, etc. by a sequencer.

SUMMARY

According to an aspect of an embodiment, a reconfigurable computing apparatus includes plural computing element networks respectively formed of computing elements of an identical bit width, the bit width of each of the computing element networks differing according to computing element network; a bit width converting element that converts bit widths between the computing element networks; a control signal-dedicated network that is formed of computing elements, is reconfigurable, and controls each of the computing element networks; and a sequencer that controls a timing at which circuit configurations are switched with respect to the computing element networks, the control signal-dedicated network, and the bit width converting element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic for explaining computing elements included in the reconfigurable computing apparatus depicted in FIG. 1;

DESCRIPTION OF EMBODIMENTS

Preferred embodiments of the present invention will be explained with reference to the accompanying drawings.

Figure 1:
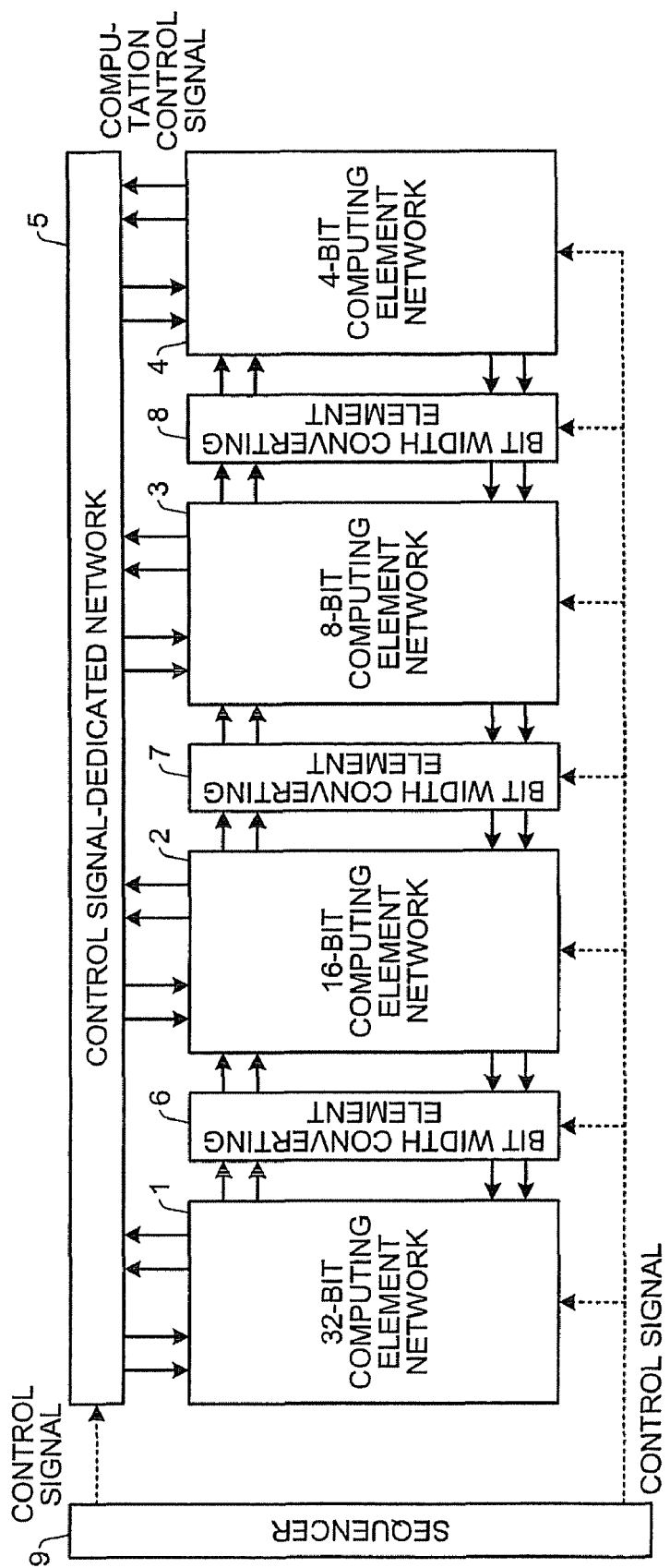
FIG. 1 is a schematic of a reconfigurable computing apparatus according to an embodiment of the present invention.

FIG. 1 is a schematic of a reconfigurable computing apparatus according to an embodiment of the present invention. As depicted in FIG. 1, a computing apparatus includes, for example, a 32-bit computing element network 1, a 16-bit computing element network 2, an 8-bit computing element network 3, a 4-bit computing element network 4, a control signal-dedicated network 5, bit width converting elements 6, 7, 8, and a sequencer 9.

The 32-bit computing network 1 includes 32-bit computing elements, i.e., computing elements (processor element (PE)) forming a reconfigurable network. The same is true for the 16-bit computing element network 2, the 8-bit computing element network 3, and the 4-bit computing element network 4, which respectively include computing elements of 16 bits, 8 bits, and 4 bits.

Each of the computing element networks 1, 2, 3, 4 process external data. Although FIG. 1 depicts the computing element networks 1, 2, 3, 4 arranged in sequential order, configuration is not limited hereto. The control signal-dedicated network 5 is shared among the computing element networks 1, 2, 3, 4, transmits and receives computing control signals between the computing element networks 1, 2, 3, 4, and controls whether computing is performed at the computing element networks 1, 2, 3, 4. The control signal-dedicated network 5 is formed by a reconfigurable network of computing elements.

The bit width converting elements 6, 7, 8 convert bit widths between the computing element networks 1, 2, 3, 4. In the example depicted in FIG. 1, the bit width converting element 6 positioned between the 32-bit computing element network 1 and the 16-bit computing element network 2, compresses (rounds) the 32-bit data of the 32-bit computing element network 1 to 16-bit data to be passed onto the 16-bit computing element network 2, and extends (expands) the 16-bit data of the 16-bit computing element network 2 to 32-bit data to be passed onto the 32-bit computing element network 1.

Similarly, the bit width converting element 7 positioned between the 16-bit computing element network 2 and the 8-bit computing element network 3, and the bit width converting element 8 positioned between the 8-bit computing element network 3 and the 4-bit computing element network 4 respectively compress and extend bits between 16 bits and 8 bits, and 8 bits and 4 bits. The sequencer 9 controls the timing at which circuit configurations are switched with respect to the computing element networks 1, 2, 3, 4, the control signal-dedicated network 5, and the bit width converting elements 6, 7, 8. A dedicated sequencer may be provided respectively for the computing element networks 1, 2, 3, 4, the control signal-dedicated network 5, and the bit width converting elements 6, 7, 8.

FIG. 2 is a schematic for explaining computing elements at each bit. As depicted in FIG. 2, the computing elements include logic PEs that execute AND (logical AND), OR (logical OR), EOR (logical Exclusive OR), INV (inversion), etc.; compare PEs that execute compare/add-subtract instructions and generate predicates; shift PEs that execute shift/mask instructions; addition-subtraction PEs that execute add-subtract instructions; predicate PEs that generate predicates according to specific condition judgments; multiplication PEs that execute multiplication and are capable of connecting to upper bit width; delay PEs that generate delays of one clock cycle; counter PEs that perform count operations and generate predicates; RAM_PEs that hold data; extension PEs that extend the bit count of data, round PEs that are used in conjunction with multiplication PEs and that compress the bit count of data; absolute value/complement PEs that execute absolute value/complement instructions; and accumulate PEs that accumulate, round, and output with respect to data input.

These computing elements include computing elements of 32, 16, 8, and 4 bits. Among the computing elements depicted in FIG. 2, the computing element networks 1, 2, 3, 4 respectively include the computing elements of 32-bits, 16-bits, 8-bits, and 4-bits. The control signal-dedicated network 5 includes predicate computing elements. The bit width converting elements 6, 7, 8 include extension computing elements that handle bit widths to be converted, round PEs, multiplication PEs, etc.

Figure 3:
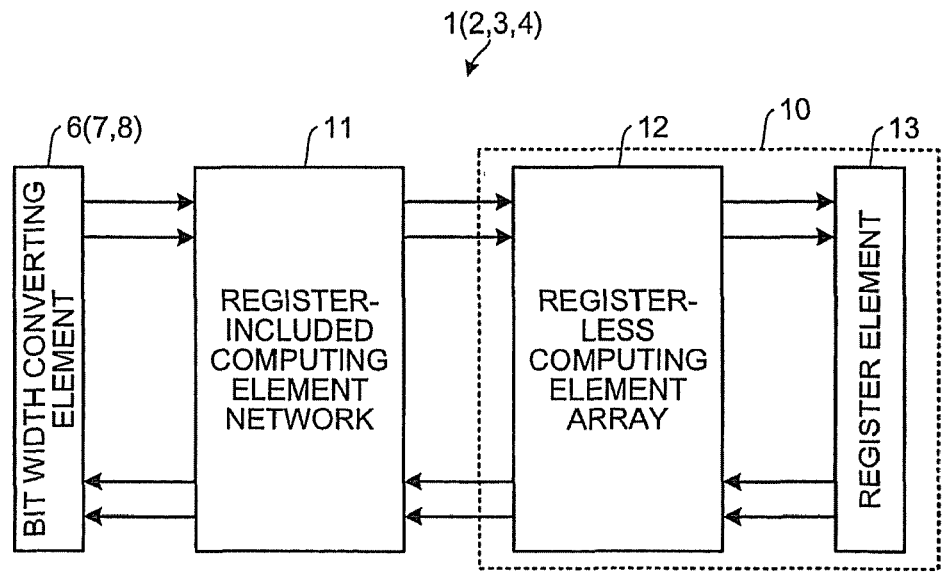
FIG. 3 is a schematic of a configuration of computing element networks.

FIG. 3 is a schematic of a configuration of the computing element networks 1, 2, 3, 4. As depicted in FIG. 3, each of the computing element networks 1, 2, 3, 4 are, for example, separated into a register-less computing element network 10 formed of computing elements without registers (in FIG. 2, PEs listed under attribute as "no register"), and a register-included computing element network 11 formed of computing elements that include registers (in FIG. 2, PEs listed under attribute as "has register").

The register-less computing element network 10 includes a register-less computing element array 12 of register-less computing elements and a register element 13. The register-included computing element network 11 is connected to the bit width converting elements 6 (7, 8) enabling bidirectional data transmission. The register-less computing element array 12 is connected to the register-included computing element network 11 enabling bidirectional data transmission and to the register element 13 enabling bidirectional data transmission.

For example, data input to the register-included computing element network 11 from the bit width converting element 6 (7, 8) is computed, as necessary, at the register-included computing element network 11. As necessary, the computation result is input to the register-less computing element array 12, is computed and the result is output to the register element 13. Data output from the register element 13 is input to the register-less computing element network 12 and as necessary, is computed at the register-less computing element network 12. The result is input to the register-included computing element network 11 and as necessary, is computed and output to the bit width converting elements 6 (7, 8).

Figure 4:
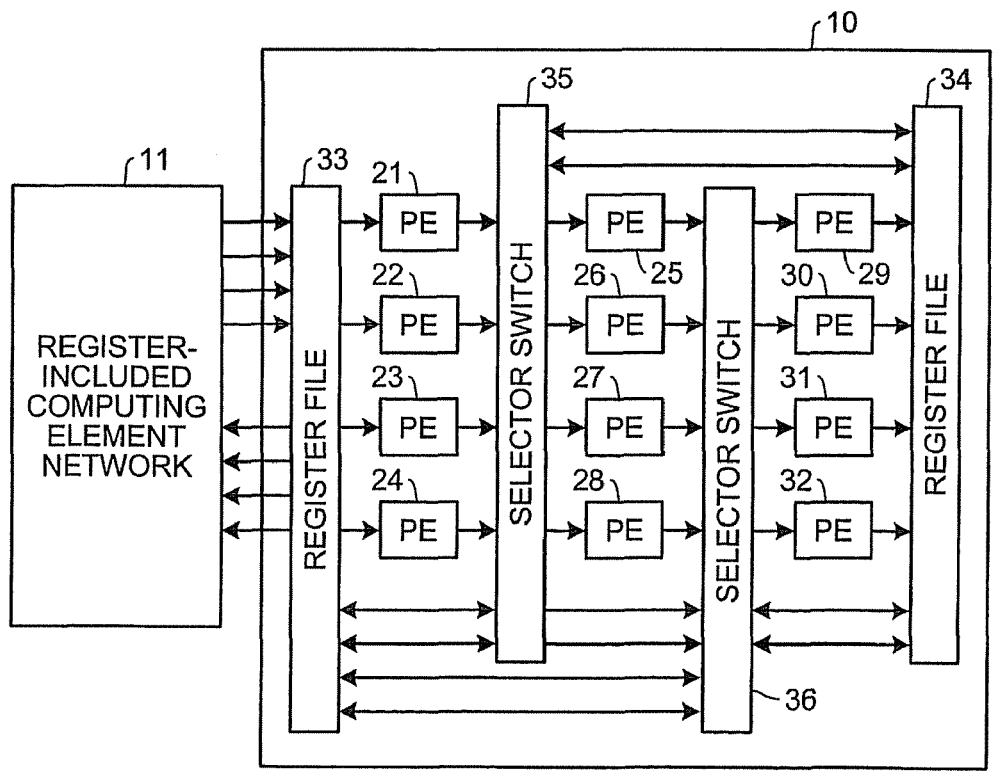
FIG. 4 is a schematic of a configuration of a register-less computing element network.

FIG. 4 is a schematic of a configuration of the register-less computing element network. As depicted in FIG. 4, the register-less computing element network 10 includes, for example, computing elements without registers 21 to 32, register files 33, 34, and selector switches 35, 36. The computing elements 21 to 32 are arranged, for example, in a 4×3 matrix; however, configuration is not limited hereto. The register files 33, 34 correspond to the register element 13 and are configured by flip-flops. The flip-flops operate at the same clock as the register-included computing element network 11.

The register file 33 that is upstream is connected to the register-included computing element network 11. The computing elements 21 to 24 in the first column are connected to output terminals of the register file 33. The selector switch 35 is connected to output terminals of the computing elements 21 to 24. The computing elements 25 to 28 in the second column are connected to the output terminals of the selector switch 35. The selector switch 36 that is downstream is connected to output terminals of the computing elements 25 to 28. The computing elements 29 to 32 in the third column are connected to output terminals of the selecting switch 36.

The register file 34 that is downstream is connected to the computing elements 29 to 32. The register file 33 and the selector switches 35, 36 are connected enabling mutual data transmission. The register file 34 and the selector switches 35, 36 are connected enabling mutual data transmission.

Data transmission between the selector switches 35, 36 may be unidirectional from the former to the latter. Thus, in the register-less computing element network 10, between the register files 33, 34 at the ends thereof, the columns of computing elements without registers and the selector switches are arranged so that the selector switch 35 is sandwiched between computing element columns. The register files 33, 34 may include a selector switch, in which case, the selector switch is controlled based on configuration memory.

The selector switches 35, 36 are controlled based on configuration memory determining the overall control method. Under such control, for example, data input to the register-less computing element network 10 from the register-included computing element network 11 is sent through the register file 33 to one of the computing elements 21 to 24 in the first column or to one of the selector switches 35, 36. If the data is sent to one of the computing elements 21 to 24, the computation result is sent to the selector switch 35.

The data input to the selector switch 35 is sent to one of the computing elements 25 to 28 in the second column or to the selector switch 36, or is returned to the register file 33. If the data is sent to one of the computing elements 25 to 28 in the second column, the computation result is sent to the selector switch 36. The data input to the selector switch 36 is sent to one of the computing elements 29 to 32 in the third column or to the register file 34, or is returned to the register file 33.

If the data is sent to one of the computing elements 29 to 32, the computation result is sent to the register file 34. The data input to the register file 34 is returned to the selector switch 35 or 36. The data returned to the register file 33 is again sent through the register-less computing element network 10 as described, or is sent to the register-included computing element network 11.

Thus, within the register-less computing element network 10, data passes through the register file 33 or 34 and is output from the register file 33 or 34 synchronized with the clock. Consequently, the register-less computing element network 10 and the register-included computing element network 11 may be synchronized.

Figure 5:
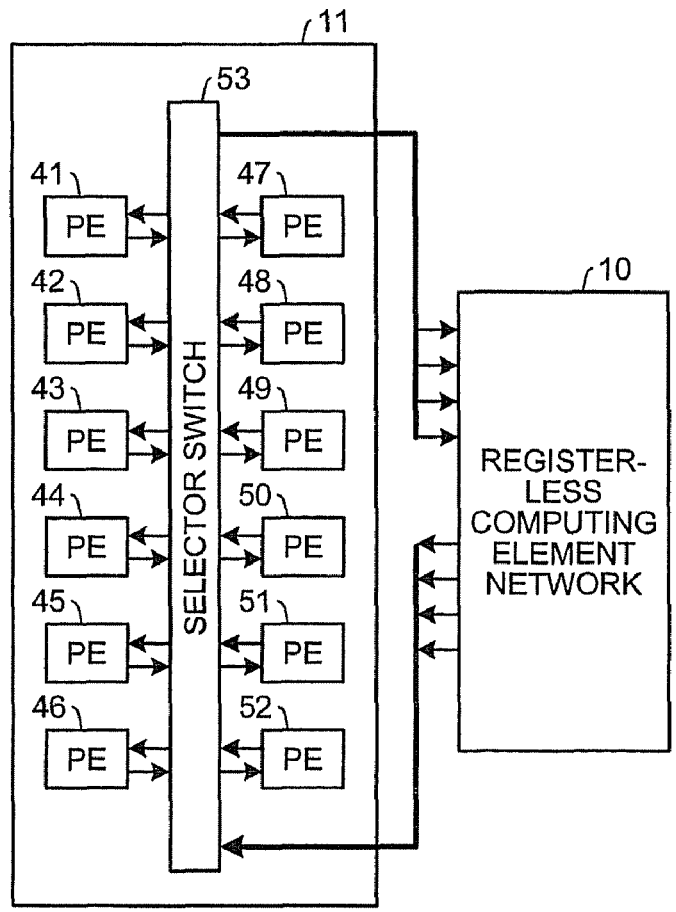
FIG. 5 is a schematic of a configuration of a register-included computing element network.

FIG. 5 is a schematic of a configuration of the register-included computing element network. As depicted in FIG. 5, the register-included computing element network 11 includes, for example, computing elements 41 to 52 that include registers and a selector switch 53. The computing elements 41 to 52 are arranged in two columns and operate according to the same clock as the register-less computing element network 10. The selector switch 53 is arranged between the computing elements 41 to 46 in the first column and the computing elements 47 to 52 in the second column, and is capable of bidirectional data transmission with each of the computing elements 41 to 52. Further, the selector switch 53 is connected to the register-less computing element network 10 enabling bidirectional data communication.

Figure 6:
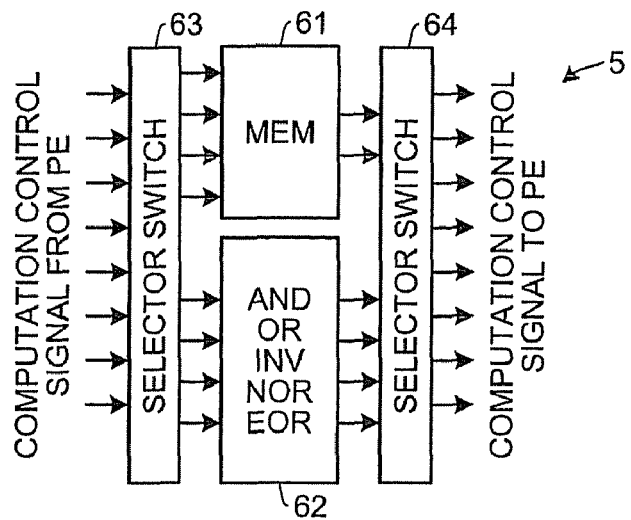
FIG. 6 is a schematic of a configuration of a control-signal dedicated network.

FIG. 6 is a schematic of a configuration of the control-signal dedicated network. As depicted in FIG. 6, the control signal-dedicated network 5 includes, for example, a memory unit 61 storing therein a lookup table; a logic unit 62 that executes AND, OR, INV, NOR (logical Not OR), EOR, etc.; and selector switches 63, 64. Computation control signals from the computing element networks 1, 2, 3, 4 are passed onto the memory unit 61 or to the logic unit 62 through the selector switch 63 that is upstream.

When a computation control signal is passed onto the memory unit 61, the lookup table is referenced and a signal according to the computation control signal is output from the memory unit 61. When the computation control signal is passed onto the logic unit 62, a logical computation result according to the computation control signal is output from the logic unit 62. A signal output from the memory unit 61 or the logic circuit 62 is sent back to the same computing element network or to a different computing element network through the selector switch 64 that is downstream.

As described, according to the present embodiment, among the computing element networks 1, 2, 3, 4, respectively of 32-bits, 16-bits, 8-bits, and 4-bits, according to the bit count of a computation, a computing element network formed by computing elements of a bit width coinciding with the bit count is selected and the selected computing element network executes the computation. When the computing element network receives data from another computing element network of computing elements having a different bit rate, the bit width converting elements 6, 7, 8 convert the bit count of the data to the bit width of the computing element network that has received the data. The control signal-dedicated network 5 is shared by all of the computing element networks 1, 2, 3, 4; thus, deterioration in performance with respect to control signals may be minimized. Therefore, a reconfigurable computing apparatus that implements a combination of computing elements of differing bit widths and is capable of preventing reductions in area efficiency resulting from the bit width of computing elements being different from the bits of a computation and deterioration in latency may be achieved.

Without limitation to the embodiment, various modifications are possible. For example, the computing element networks 1, 2, 3, 4 may be configured to have unique data networks, where asynchronous loop connection lines are suppressed by bus switch type connections. Further, configuration may be such that all computing elements are computing elements that include a register, without employing register-less computing elements.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A reconfigurable computing apparatus comprising:
   a plurality of computing element networks respectively formed of computing elements of an identical bit width, the bit width of each of the computing element networks differing according to computing element network;
   a bit width converting element that converts bit widths between the computing element networks;
   a control signal-dedicated network that is formed of computing elements, is reconfigurable, and controls each of the computing element networks; and
   a sequencer that controls a timing at which circuit configurations are switched with respect to the computing element networks, the control signal-dedicated network, and the bit width converting element.

2. The reconfigurable computing apparatus according to claim 1, wherein
   the computing element network is separated into a network of register-less computing elements and a network of register-included computing elements, the network of register-less computing elements and the network of register-included computing elements being connected in series or as a loop.

3. The reconfigurable computing apparatus according to claim 2, wherein
   the network of register-less computing elements is connected to the network of register-included computing elements, and
   the network of register-included computing elements is connected to the bit converting element.

4. The reconfigurable computing apparatus according to claim 3, wherein the network of register-less computing elements includes computing elements without registers, a register file, and a first selector switch.

5. The reconfigurable computing apparatus according to claim 4, wherein
   the network of register-less computing elements is arranged in a matrix of m rows and n columns of the computing elements, among which a first column of the computing elements is connected to a first register file that is connected to the network of register-included computing elements and the n-th column of the computing elements is connected to a second register file that receives output from the n-th column of the computing elements,
   the first selector switch switches connection relationships between output from a computing element and input to a computing element downstream, is sandwiched between the columns of the computing elements, and connected enabling bidirectional data transmission with the first register file and the second register file and data transmission to the first selector switch immediately downstream.

6. The reconfigurable computing apparatus according to claim 3, wherein the network of register-included computing elements includes computing elements with registers and a second selector switch.

7. The reconfigurable computing apparatus according to claim 6, wherein
the computing elements with registers are connected to the second selector switch enabling bidirectional data transmission with the second selector switch,
the second selector switch is connected with the network of computing elements without registers enabling bidirectional data transmission with the computing elements without registers.

8. The reconfigurable computing apparatus according to claim 4, wherein the control signal-dedicated network, based on a control signal from a computing element network, controls the computing elements of the computing element network or the computing elements of another computing element network.

9. The reconfigurable computing apparatus according to claim 6, wherein the control signal-dedicated network, based on a control signal from a computing element network, controls the computing elements of the computing element network or the computing elements of another computing element network.

* * * * *